United States Patent [19]

Carney

[11] 4,164,774

[45] Aug. 14, 1979

[54] ELECTRODE FOR TELEPHONE PROTECTOR MODULES

[75] Inventor: William V. Carney, Valley Stream, N.Y.

[73] Assignee: Porta Systems Corp., Syosset, N.Y.

[21] Appl. No.: 945,774

[22] Filed: Sep. 25, 1978

[51] Int. Cl.[2] .............................................. H02H 3/22

[52] U.S. Cl. ........................................ 361/119; 313/27

[58] Field of Search ....................... 361/117, 119, 126; 313/217

[56] References Cited

U.S. PATENT DOCUMENTS

| | | | |
|---|---|---|---|
| 1,765,531 | 6/1930 | Howard et al. | 361/119 X |
| 3,252,038 | 5/1966 | Calvesbert et al. | 361/126 X |
| 3,703,665 | 11/1972 | Yereance et al. | 361/126 |
| 4,013,927 | 3/1977 | Gilberts | 361/119 |
| 4,128,855 | 12/1978 | Gilberts | 361/119 |

*Primary Examiner*—Harry E. Moose, Jr.
*Attorney, Agent, or Firm*—Charles E. Temko

[57] ABSTRACT

An improved electrode construction for use in telephone connector modules characterized in at least one of the pair of electrodes having on an operative surface thereof, a plurality of radially extending raised plateau areas separated by grooves which serve to collect eroded particles and provide a means for venting the particles from the air gap separating the pair of electrodes. A centrally disposed through bore extends between the grooved surface and a second planar end surface of the electrode to provide additional venting.

3 Claims, 4 Drawing Figures

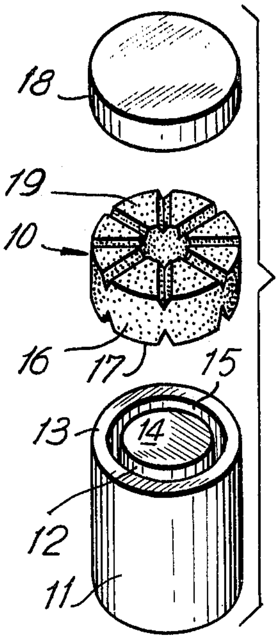
FIG. 1
FIG. 4
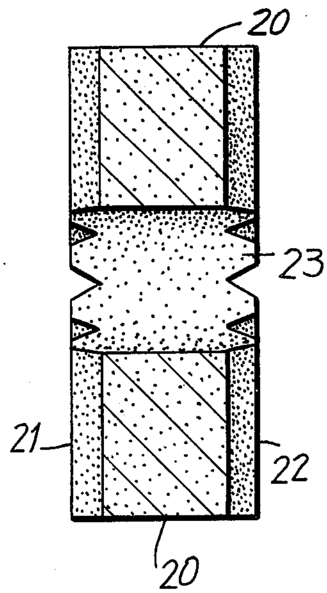
FIG. 2
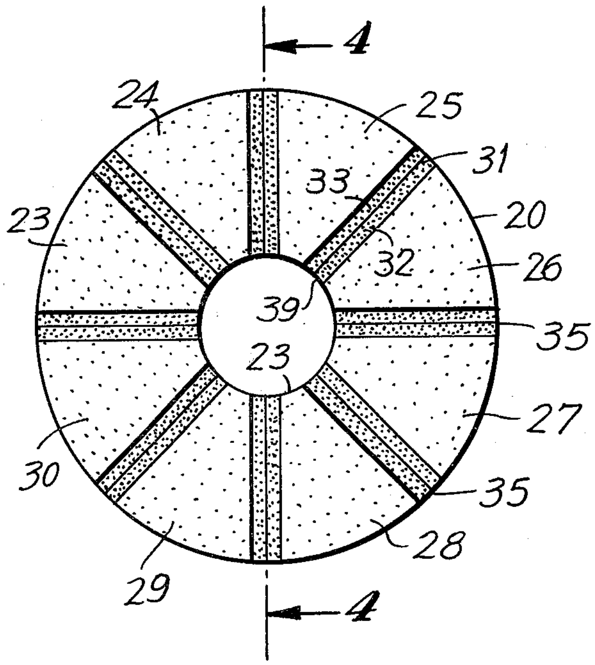
FIG. 3
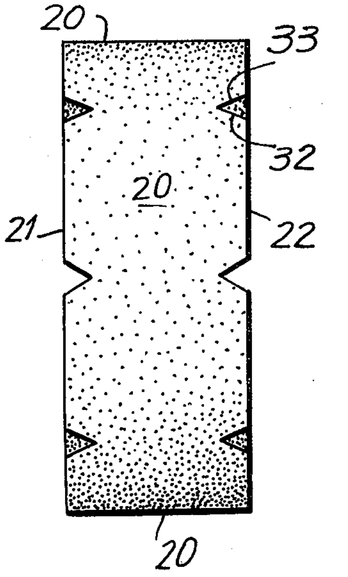

ELECTRODE FOR TELEPHONE PROTECTOR MODULES

BACKGROUND OF THE INVENTION

This invention relates generally to the field of telephone protector modules of the type used in conjunction with individual telephone subscriber circuits to protect the same against the deleterious effects of excessive voltage and corresponding amperage, which, if not grounded, causes extensive damage to the telephone system.

Such devices are well-known in the art, and almost all include a component having a pair of carbon electrodes which are placed in mutually spaced relation to define an air gap. One electrode is connected to a source of ground potential, and the other electrode is connected to an individual subscriber line. When excessive voltages are placed upon the line, the current temporarily arcs over the gap to ground potential. When the condition causing the excessive current terminates, the gap provides a means for insulating normal currents from ground potential and prevents current leakage.

Such devices, sometimes referred to as spark gap arrestors, have proven effective within a relatively limited life span. Rural electrification authority standards existing for some time have required a useful average life of 40 firings before failure. Most conventional carbon electrodes do not achieve this goal, despite considerable research involving such factors as the quality of carbon from which the electrodes are formed, the type of binding material employed during manufacture, and subsequent treatment to reduce the tendency to disintegrate.

It has been established that electrode failure is attributed to two major factors, one being the presence of excessive humidity between the electrode surfaces during firing. This problem has been somewhat alleviated by the post-fabricating step of dipping the electrodes in dilute solution of propylene glycol or other dilute sealants to cause a thin film of a wax-like coating to at least partially seal the exposed and internal surfaces of the carbon particles comprising the electrode.

More serious is the gradual degradation of the electrode surface caused by upheaval and fission of the electrode surfaces occurring during the generation of heat incident to arcing.

Some progress has been made in ameliorating this problem. As disclosed in U.S. Pat. No. 3,703,665; granted Nov. 21, 1972 to Robert A. Yereance, et al, it has been found that the creation of raised plateaus separated by grooves on the operative face of at least one electrode, permits the venting of the air gap allowing the discharge of carbon particles which have been loosened under erosion caused by arcing when the device is in operation. The generated heat expands air disposed within the gap, the air blowing the loosened particles through the passages formed by the grooves. This teaching also refers to specific depths of grooves in relation to gap distance between the electrodes for the purpose of eliminating, or at least inhibiting the formation of moisture in the gap during periods of changing atmospheric pressure and temperature. The use of particular grooved patterns, stated as a ratio of the area of plateau to combined plateau and grooved area is employed to reduce surface eruption and cratering caused by repeated firings.

While such electrodes offer a material advantage in terms of longevity as compared to conventional flat surfaced electrodes, the grid-like patterns employed do not provide the best venting of loose particulate material. Additionally, the molding of relatively complex patterns on the exposed operative surfaces of the electrode is a difficult manufacturing operation, and breakage rates are correspondingly high. The venting of such patterns is usually not along straight lines, and maximum possible venting action is therefore not obtained.

SUMMARY OF THE INVENTION

Briefly stated, the invention contemplates the provision of an improved carbon electrode of the class described in which the operative end surface is provided with a plurality of pie-shaped sectors forming lands or raised surfaces radially extending from a central axis. A longitudinally oriented bore extends along the principal axis of the carbon and communicates with the operative face and a parallel oppositely disposed end surface. The apex of each sector is located at the end of said bore. Although the surfaces of each sector are formed to lie generally in a common plane, minute commercial tolerances causes portions of one sector to be initially positioned closer to the oppositely disposed carbon electrode. The sector which is closest to the other electrode will receive the electric arc during a first firing, thus eroding the surface of this sector. During the next cycle of firing, the next closest sector will receive the arc and also erode. With repeated firings, the sectors will erode to approximately the same degree, and a commutating effect is thereby achieved. The centrally disposed bore extends the full length of the electrode, and provides a venting channel which is positioned very close to the area of arcing, thereby providing a venting action heretofore unobtainable.

The pie-shaped sectors are separated by radially extending grooves to provide additional venting, these grooves bounding the rectilinear sides of individual sectors, and providing the greatest venting action adjacent the sector receiving the arc during a firing.

In the disclosed embodiment, the radially extending grooves are formed on both faces of the carbon electrode, to permit the oppositely disposed end surface of the electrode to communicate with the central bore and provide additional venting action. By making both surfaces substantially identical, assembly of the completed protector module is facilitated.

BRIEF DESCRIPTION OF THE DRAWING

In the drawing, to which reference will be made in the specification, similar reference characters have been employed to designate corresponding parts throughout the several views.

FIG. 1 is an exploded view in perspective of an embodiment of the invention.

FIG. 2 is an end elevational view of a carbon electrode forming a part of the disclosed embodiment.

FIG. 3 is a side elevational view thereof.

FIG. 4 is a central longitudinal sectional view thereof.

DETAILED DESCRIPTION OF THE ENCLOSED EMBODIMENT

In accordance with the invention, the device, generally indicated by reference character 10, is normally contained within a suitable housing (not shown) of well-known type, and, as seen in FIG. 1, includes a ceramic sleeve 11, mounting an elongated carbon electrode 12. The sleeve 11 includes an end surface 13 which is parallel to the end surface 14 of the electrode 12 and forms an air gap 15 with respect to an abutted second electrode 16 having an end surface 17 which is thereby positioned opposite the surface 14. A metal disc 18 or other suitable conductor abuts an opposite surface 19 of the second electrode 16. At this general construction is well known in the art, it need not be further considered in detail in the present disclosure.

Referring to FIG. 2 in the drawing, the second electrode 16 is of conventional overall configuration, i.e. a short solid cylinder, and is bounded by a cylindrical side surface 20 and first and second end surfaces 21 and 22, respectively. A through bore 23 extends between the surfaces 21 and 22.

A plurality of planar generally pie-shaped sectors 25, 26, 27, 28, 29 and 30 are delineated by the corresponding plurality of radially extending grooves 31 which are preferably a V-shaped cross-section. Each groove is substantially similar, including first and second surfaces 32 and 33, and terminating at an inner end 34 where it communicates with the bore 23 and an outer end 35 where it meets the side surface 20.

While exact dimensions are not critical, we have found that using conventional air gap distances of 0.020 inch, and a conventional outer diameter of the second electrode of approximately 0.302–0.32 inch, a suitable diameter for the central bore is approximately 0.08 inch in diameter. The grooves are typically of 60 degree configuration, and have a nominal depth of 0.020 inch, where the total axial thickness of the electrode is approximately 0.125 inch.

Although so illustrated in the drawing, the groove pattern on the surfaces 21 and 22 need not be congruent, since the venting function obtained is independent of such congruency.

It will be observed that although conventional fabrication technique permits the formation of the exposed surfaces of the sectors 25–30 such that they will lie in a common plane, normal commercial tolerances will allow as much as 0.0004 inch difference between adjacent sector surfaces. Such differences will cause one sector to be closer to the opposed surface on the electrode 12 that when firing occurs, the bulk, if not all of the spark will be received by such sector. With generated heat, air trapped within the air gap will rapidly expand, and venting will occur both radially along the two bounding grooves, and longitudinally through the bore and ultimately through the grooves on the oppositely disposed end surface. With this combination, a far superior venting effect occurs which permits both rapid elimination of loose carbon particles and less entrapment of moisture which occurs during extensive periods of time between firings.

We wish it to be understood that we do not consider the invention limited to the precise details of structure shown and set forth in this specification, for obvious modification will occur to those skilled in the art to which the invention pertains.

I claim:

1. In a telephone line protective device including a pair of spaced electrodes and an insulating sleeve mounting one of said electrodes and forming an inner gap between said pair of electrodes, the improvement comprising: at least one of said opposed surfaces having a plurality of radially arranged grooves extending into the surface thereof to define a corresponding plurality of pie-shaped sectors therebetween; said electrode having a principal longitudinal axis, there being an axially aligned through bore extending from one of said opposed surfaces, and communicating at one end thereof with said radially arranged grooves; whereby during arcing between said opposed surfaces, venting takes place in both axial and radial directions with respect to said principal axis.

2. The improvement as set forth in claim 1, further characterized in said grooves being of V-shaped cross-section.

3. The improvement set forth in claim 1, further characterized in the electrode having said radially arranged grooves having a second parallel oppositely disposed surface, said last mentioned surface having corresponding grooves therein communicating with a corresponding end of said bore.

* * * * *